(12) United States Patent
Jiang

(10) Patent No.: US 6,207,045 B1
(45) Date of Patent: Mar. 27, 2001

(54) WATER-IN-FUEL INTEGRATED CONTROL MODULE

(75) Inventor: Zemin Jiang, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/333,761

(22) Filed: Jun. 15, 1999

(51) Int. Cl.$^7$ .................................................. B01D 17/12
(52) U.S. Cl. .......................... 210/86; 210/114; 210/138; 210/313; 340/620
(58) Field of Search ............................ 210/86, 104, 112, 210/114, 744, 746, 138, 299, 307, 313; 137/392, 395, 403, 408, 620; 340/612, 618, 620; 73/61.43, 64.55

(56) References Cited

U.S. PATENT DOCUMENTS

| | | | |
|---|---|---|---|
| 1,604,763 | 10/1926 | Snyder et al. | 137/392 |
| 1,722,160 | 7/1929 | Smith | 137/392 |
| 3,966,603 | 6/1976 | Grant | 210/86 |
| 4,227,173 | 10/1980 | Clark | 340/59 |
| 4,264,442 | * 4/1981 | Jackson | 210/114 |
| 4,470,301 | * 9/1984 | Hutchins et al. | 210/114 |
| 4,539,109 | * 9/1985 | Davis | 210/114 |
| 4,637,351 | * 1/1987 | Pakula | 210/114 |
| 5,078,901 | 1/1992 | Sparrow | 210/744 |
| 5,534,161 | 7/1996 | Tarr et al. | 210/744 |

* cited by examiner

Primary Examiner—Joseph W. Drodge
(74) Attorney, Agent, or Firm—Woodard, Emhardt, Naughton, Moriarty & McNett

(57) ABSTRACT

An integrated control module for connection to a fuel-water separator for controlling the drainage of water from the fuel-water separator includes a water-in-fuel sensor having a pair of spaced-apart probes, a drain valve whose open or closed condition is controlled by a solenoid, an electrical connector for receiving input power and a control circuit arranged with first and second circuit portions which cooperate so as to control the energizing of the solenoid and thus the opening or closing of the drain valve based on the resistance between the pair of spaced-apart probes. The integrated control module is designed to attach to either a sidewall or a base of the fuel-water separator so that the probes extend into the interior of the fuel-water separator into a region where separated water accumulates. The resistance between the probes is then used as a means for sensing an average probe voltage which in turn determines the state of the solenoid. Timing circuits are provided so as to prevent any toggle effect and to keep the drain valve open for a sufficient time duration in order to drain a suitable volume of accumulated water.

16 Claims, 4 Drawing Sheets

WATER-IN-FUEL INTEGRATED CONTROL MODULE

BACKGROUND OF THE INVENTION

The present invention relates in general to fuel-water separation arrangements which are used in conjunction with a fuel filter to separate water from fuel so that the accumulated water can be removed from the fuel filter. Removal of the water is typically accomplished by means of a valve-controlled drain. More specifically, the present invention relates to the design, packaging, and assembly of a water-in-fuel conditioning transducer, or as referred to herein, an integrated control module. The integrated control module of the present invention incorporates a solenoid-controlled drain valve with a water-in-fuel sensor and controller circuitry for detecting and removing water trapped in the collection bowl of a water-separating fuel filter.

The water which is separated from the diesel fuel and collected in the fuel filter bowl requires periodic draining in order to prevent loss of filter capacity and costly fuel system damage due to water ingestion. The integrated control module of the present invention detects the presence of this water and drains it from the fuel filter bowl. Water is detected by monitoring the impedance between two electrodes located inside the fuel filter water collection bowl. When the water detection criteria is met, the system automatically opens a solenoid-actuated drain valve for a predetermined length of time.

There are a number of earlier patent references which discuss the water-in-fuel concerns generally and which specifically evaluate the state-of-the-art in the field of diesel engine technology. While the focus of these earlier patent references is normally on a particular improvement or enhancement to the state of the art, it is still helpful to look at the background discussions in these references in order to understand the issues driving the particular inventive effort. For example, as explained in U.S. Pat. No. 5,534,161 which issued Jul. 9, 1996 to Tarr, et al., the use of water separators in diesel engine fuel filters is a well-known expedient to rid the fuel of contaminants that might cause a malfunction of the engine. Many of these earlier water separators consist merely of a water drainage reservoir at the bottom of the fuel filter connected by a drain tube which expels the water to the ground. Concern over such cavalier discharge of contaminated fluids into the environment has led to the design of water separators that collect the separated water in a container located at the bottom of the filter assembly. Such containment of the separated water requires that the driver of the vehicle periodically empty the separated water from the container prior to the container becoming full. A problem arises, however, in that the driver cannot always be relied upon to remember to empty the separated water when required. To overcome this problem, some water separators contain sensors which are activated when the water reaches a predetermined level in the reservoir, thereby energizing a signal light located on the dashboard of the vehicle which warns the driver of the need to drain the filter. However, such signals still require that the driver stop the vehicle and manually empty the separated water from the filter unit. This represents an inconvenience to the driver, and there is still no guarantee that the driver will not simply ignore the warning light on the dashboard. Accordingly, it was concluded that there was a need for a fuel system that provides for the automatic draining of water separated from the fuel in the fuel filter when such separated water reaches a predetermined level.

The invention which was conceived in the Tarr, et al. patent involves the design of an automatic water drain and priming pump for a fuel system in which a reversible pump is operable in a first direction to pump separated water out of a fuel filter and into a water drain and further operable in a second (opposite) direction to pump fuel into the fuel filter in order to prime the fuel pump. Operation of the pump in the first direction to drain water from the fuel filter is initiated by water-in-fuel sensors within the fuel filter. Operation of the pump in the second direction to prime the fuel pump is initiated by manual activation of a switch during servicing of the fuel filter.

While the invention of the '161 patent is believed to have achieved its objectives, there remain opportunities for further improvements. For example, the complexity of certain water-in-fuel drain systems is a disadvantage. Another disadvantage of earlier systems is the need to assemble numerous components and make various connections, one-by-one, in order to establish all of the system requirements.

It would be an improvement to existing fuel water separation units and the design of the water drain function to configure the water-in-fuel sensor and drain valve functions into an integrated control module which is designed to assemble directly to the wall of the fuel filter housing. In this manner, there is a design simplicity and efficiency. It is easy to fabricate the integrated control module of the present invention separate from the fuel filter, a feature which facilitates the repair of the fuel filter as well as the repair or replacement of the integrated control module. If operational problems occur with the integrated control module, for example, it can be readily disassembled, a replacement integrated control module attached, and the removed integrated control module evaluated for repair or replacement. When all of the components and connections are assembled together as loose, separate items, there is no integration and thus no integrated control module. Accordingly, there is no way to easily substitute a replacement integrated control module while the original equipment integrated control module is being evaluated and/or repaired.

The present invention provides an improvement to the current state of the art in the field of fuel water separation units by configuring an integrated control module which provides design simplicity and ease of assembly and use, all in a single package with a single external connection for the source of power. The package is designed for attachment directly to a fuel filter housing, either on the side (first embodiment) or onto the base (second embodiment).

SUMMARY OF THE INVENTION

An integrated control module for connection to a source of electricity and for use in conjunction with a fuel-water separator according to one embodiment of the present invention comprises a water-in-fuel sensor having a pair of spaced-apart probes which are positioned relative to said fuel-water separator so as to be contacted by said accumulated water, a drain valve having a water-in conduit which is constructed and arranged to be positioned in the accumulated water at a location which is remote from the probes and further including a water-out conduit to route accumulated water out of the fuel-water separator, a solenoid constructed and arranged to control the flow of accumulated water from the water-in conduit to the water-out conduit, the solenoid being in a normally-closed condition which blocks any flow of accumulated water out of the fuel-water separator, an electrical connector having a positive terminal and a negative terminal and being constructed and arranged for connection to a source of electricity and a control circuit having a first circuit portion and a cooperating second circuit portion which together control the energizing of the solenoid in order to open the drain valve and allow accumulated water to flow out of the fuel-water separator. Energizing of the solenoid is based on an average probe voltage which is derived from the resistance between the pair of spaced-apart probes.

One object of the present invention is to provide an improved integrated control module for use with a fuel-water separator.

Related objects and advantages of the present invention will be apparent from the following description.

DESCRIPTION OF THE PREFERRED EMBODIMENT

Figure 1:
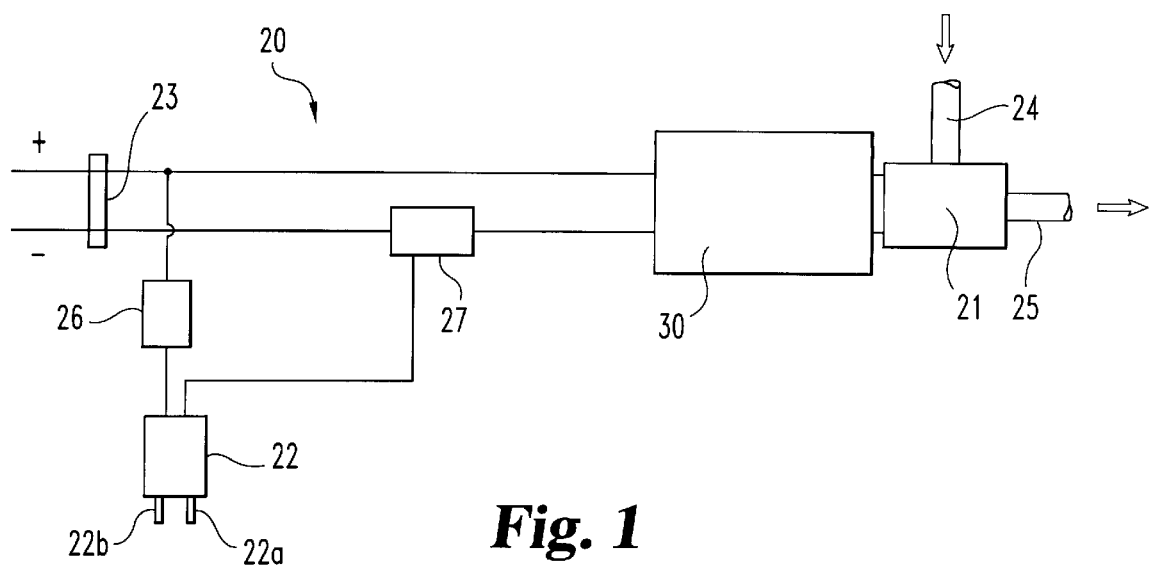
FIG. 1 is diagrammatic illustration of an integrated control module according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is provided a diagrammatic illustration of an integrated control module 20 for use in first detecting and then draining water which has accumulated in the collection bowl of a water-separating fuel filter. The integrated control module 20 is constructed and arranged to mount to the housing for the fuel-water separator portion of the fuel filter and to cooperatively interface with the interior of the fuel-water separator where separated water is collected. This region where the separated water is collected is often referred to as the collection bowl of the fuel filter.

The integrated control module 20, according to the present invention, includes a solenoid-controlled drain valve 21, a water-in-fuel sensor 22, a power connection 23, a water-in conduit 24, a water-out conduit 25, a first control circuit 26, and a second control circuit 27. The sensor 22 includes a pair of spaced-apart sensing probes 22a and 22b.

The drain valve 21 is positioned between water-in conduit 24 and water-out conduit 25. When the solenoid 30 which is also part of the integrated control module 20 is activated or energized, the drain valve opens, allowing collected water to flow via conduit 24 from its location within the collection bowl of the fuel-water separator to an external drain location via conduit 25. Once activated, the solenoid remains open for a predetermined time interval in order to cause a sufficient volume of water to drain from the collection bowl of the fuel-water separator. Except for this draining time interval, whenever electrical power is not otherwise supplied to solenoid 30, the drain valve 21 remains closed. The source of electrical power for the integrated control module is provided by an externally-fused, load dump transient protected 9-16 VDC battery supply.

Figure 3:
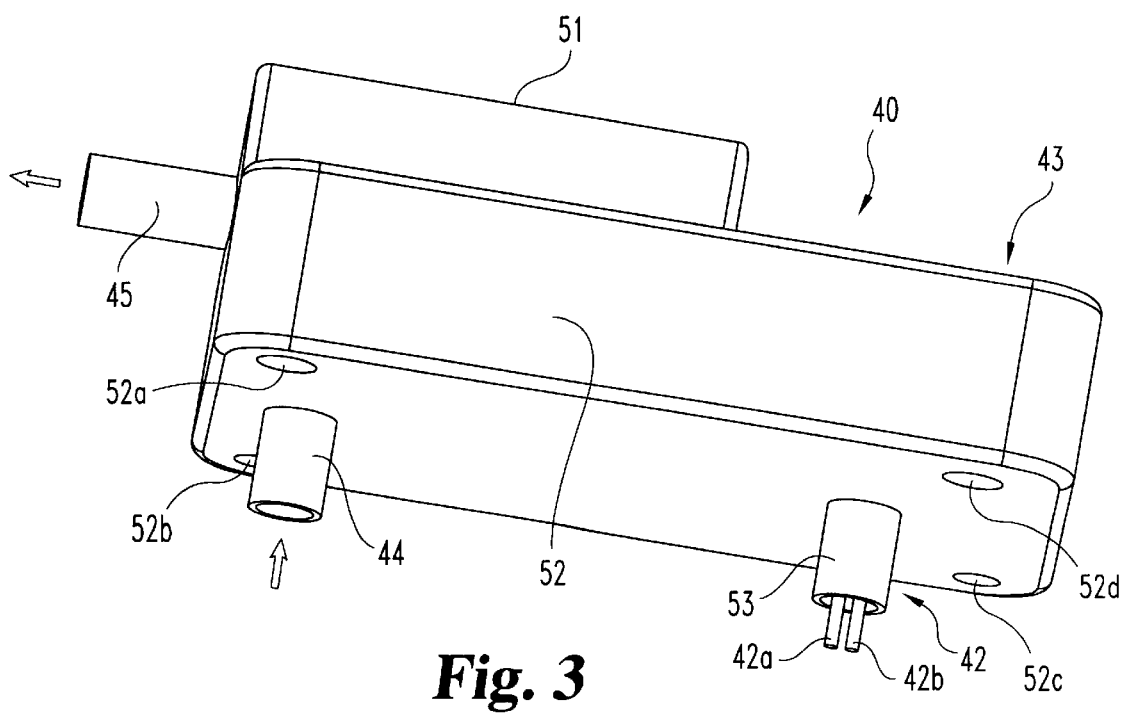
FIG. 3 is a perspective view of an integrated control module according to a first embodiment of the present invention.
Figure 2A:
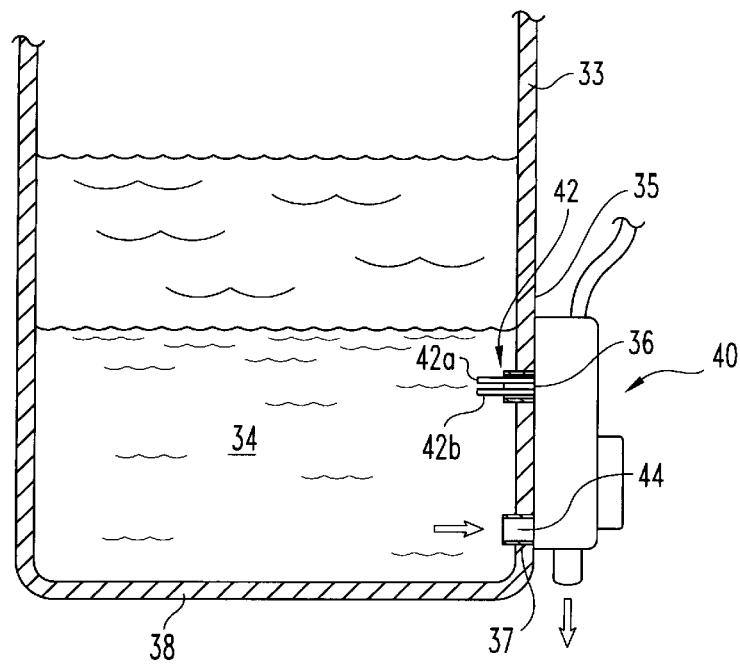
FIG. 2A is a diagrammatic illustration of one embodiment (FIG. 3) of the FIG. 1 integrated control module as mounted to a fuel-water separator housing.
Figure 2B:
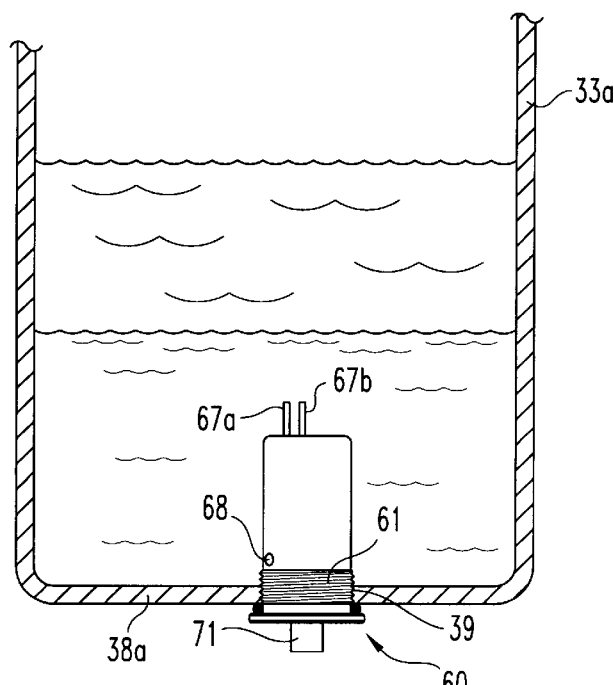
FIG. 2B is a diagrammatic illustration of another embodiment (FIG. 5) of the FIG. 1 integrated control module as mounted to a base of a fuel-water separator housing.
Figure 4:
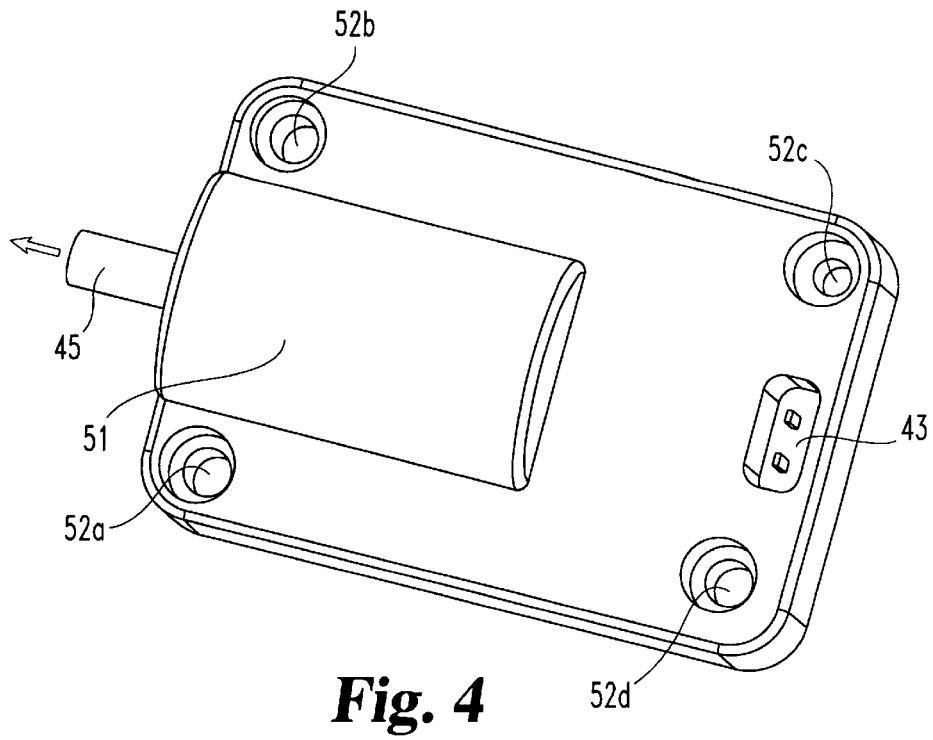
FIG. 4 is a perspective view of an integrated control module according to a first embodiment of the present invention.
Figure 5:
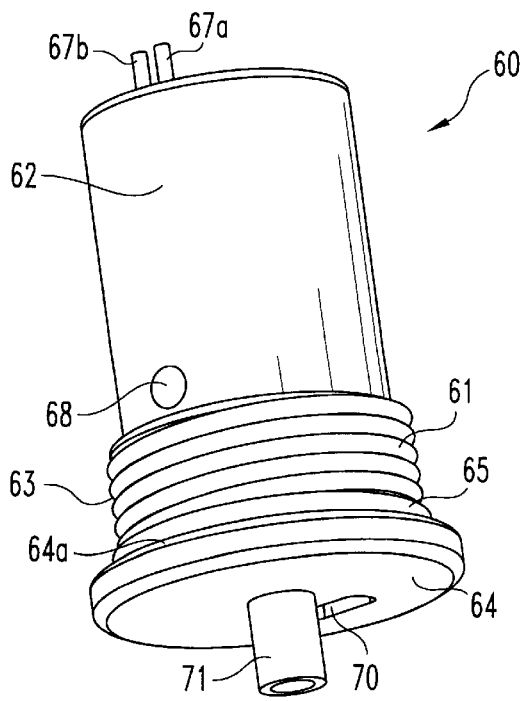
FIG. 5 is a perspective view of an integrated control module according to a second embodiment of the present invention.

FIG. 1 represents a diagrammatic and generic depiction of the two primary structural embodiments of the present invention which are illustrated in FIGS. 3, 4, and 5. In order to show the two mounting configurations for these two primary embodiments, FIGS. 2A and 2B are provided. The integrated control module embodiment of FIGS. 3 and 4 is attached to a sidewall of the fuel-water separator in FIG. 2A. The integrated control module embodiment of FIG. 5 is attached to a base of the fuel-water separator in FIG. 2B.

When properly mounted (i.e., attached) to the fuel-water separator housing 33 (see FIGS. 2A and 2B), the integrated control module (20 in FIG. 1, 40 in FIG. 3, and 60 in FIG. 5) is oriented so that the water-in conduit or opening is positioned in the interior space 34 of the separator housing 33 where water accumulates. The sensing probes are also positioned in the interior at an elevated location, closer to the water-fuel interface. The water-out conduit remains outside of the separator housing for draining accumulated water out of the separator housing.

With specific reference to FIG. 2A, the FIG. 3 integrated control module 40 is mounted to the sidewall 35 of the housing 33. Hole or opening 36 in sidewall 35 receives sensor 42 with probes 42a and 42b. Hole or opening 37 in sidewall 35 receives water-in conduit 44 which is located adjacent the base 38 of the housing 33. The edge interface between opening 37 and conduit 44 is sealed so as to prevent leakage. The water-in-fuel sensor 42 with its pair of conductive electrodes or probes 42a and 42b extend through opening 36 in housing 33. This interface is also sealed to prevent leakage. The location of opening 36 and thus the location of probes 42a and 42b is remote from base 38. Considering the base 38 as the axially lowest point of the fuel-water separator housing 33, opening 37 is located axially above base 38 while opening 36 is axially above opening 37.

As water is separated from the fuel, it collects adjacent base 38 of housing 33 and the water level rises with continued use of the fuel filter and the continued accumulation of water, noting that the water is accumulating while the drain valve is closed. Since water has a density which is greater than the density of the fuel, the separated water collects beneath the fuel adjacent the base 38 of the housing 33. The positioning of the water relative to the fuel means that the required location for the water collection bowl and thus the preferred location for the water-in conduit 44 of module 40 relative to the housing 33 is adjacent to base 38. In order to initiate the water draining cycle only after a sufficient volume of water has accumulated in the collection bowl area of the fuel filter, the preferred location for the water-in-fuel sensor probes 42a and 42b is at an axially elevated location above the water-in conduit 44.

With specific reference to FIG. 2B, the FIG. 5 integrated control module 60 is threadedly mounted into base 38a of housing 33a. An annular seal which is part of module 60 provides the sealing interface against base 38a and around the internally-threaded hole 39. The water-in opening 68 is located near base 38a while sensing probes 67a and 67b are positioned at an elevated location away from the base and closer to the water-fuel interface. The outer wall 61 of module 60 is externally threaded for the assembly into hole 39. The water-out conduit 71 is used to drain accumulated water.

While one aspect of the preferred embodiment of the present invention is the integration of all of the requisite components into a single control module, it is important to understand the functioning of the integrated control module relative to a diesel engine application. In this way, the necessity for each of the integrated components will be appreciated. For this discussion, reference is made to the general embodiment depicted in FIG. 1.

When the diesel engine is running, fuel under pressure is supplied to the fuel-water separator and also to the cooperating fuel filter. Electrical power is supplied to the integrated control module, specifically connecting to the power connection 23 which is configured with positive and negative electrical connector jacks or terminals. Electrical power is supplied to the water-in-fuel sensor 22 by way of the first control circuit 26. If the two water-in-fuel probes 22a and 22b are not in contact with water, there is no electrical continuity between these two probes and thus no electrical current through the water-in-fuel sensor. What is actually monitored by the control circuitry of the present invention is the impedance between the two probes (or electrodes) 22a and 22b. A water detection criteria is established for the specific application and system. When that criteria is met, the drain valve (solenoid-controlled) is opened for a predetermined length of time.

As described, in order for an electrical path through the water-in-fuel sensor to be established, the water level in housing 33 must rise to the level of the water-in-fuel sensor probes 22a and 22b. If there is no current path through the sensor, the second control circuit does not activate solenoid 30 and in turn the solenoid does not open the drain valve 31. When there is a current path through the water-in-fuel sensor, a condition signifying a particular and requisite water level, the second control circuit energizes the solenoid and the drain valve is opened. This in turn allows accumulated water to flow from the water-in conduit 24 through the water-out conduit 25 in order to automatically drain the water from within the housing 33. The pressure head which is present within the housing actually presses out the accumulated water.

When the water level within the collection bowl region of the fuel-water separator is at a level corresponding to the locations of probes 22a and 22b, continuity will be established between the probes for opening the drain valve. However, there is always a slight risk of generating a false signal which might be sporadic or intermittent and could be caused by any number of factors such as spray mist or vapor. A false signal might also be caused by a water level which is near the location of probes 22a and 22b, but not yet at that actual level. However, with vehicle movement and vibration, the accumulated water can yield a sporadic or intermittent signal. It is also to be noted that the diesel fuel is positioned directly above the accumulated water and thus there is continuous fluid connection between probes 22a and 22b, and this is the reason why an impedance level between the two probes is used as the determinant. For this reason, the control circuitry of the present invention determines whether or not a "valid" accumulated water level exists by checking the impedance between the probes 22a and 22b. A valid condition exists when the impedance falls between 130 K ohms and 1 K ohm for 5+/−1 seconds.

Importantly, the second control circuit is designed to remain energized so that the drain valve stays open, even when the water level falls below the level of probes 22a and 22b. If this were not the case, as soon as the water level would drop below the probe level, there would be a system shut down. This would prevent any significant volume of water drainage and would effectively create an oscillating system. Once the system is activated due to the presence of water creating a conductive bridge at or above the requisite impedance between the two probes, the drain valve opens and remains open for a predetermined time interval, even after the water level drops. The second control circuit includes a timer which causes an automatic shut down after a predetermined time interval following each activation. The time interval is based on the water level present when initial activation occurs, the volume of water to be drained, and the flow rate. The flow rate is a function of the conduits 24 and 25 and the pressure head.

The packaging of the integrated control module 20 is an important consideration in order to provide a reliable and compact unit and one which will easily mount to the fuel-water separator housing and fit within the available engine space next to the fuel-water separator housing. As has been briefly described, there are two embodiments of the present invention which are electrically identical but mechanically different. In FIGS. 3 and 4, the side-mounted embodiment of the present invention is illustrated. In FIG. 5, the base-mounted embodiment of the present invention is illustrated.

With reference to FIGS. 3 and 4, a first embodiment of the integrated control module 20 is illustrated in a side-mounted configuration and is identified as module 40. Module 40 includes all of the electrical and mechanical components of integrated control module 20, including a solenoid-controlled drain valve, water-in-fuel sensor 42, probes 42a and 42b, power connection 43, water-in conduit 44, water-out conduit 45, a first control circuit, a second control circuit, and a solenoid 51. Integrated control module 40 includes a protective housing 52 which encloses the drain valve, the first control circuit, and the second control circuit. Housing 52 is constructed and arranged with four mounting holes 52a–52d located at each of the four corners. When mounted to the side (sidewall) of the fuel-water separator housing by the use of the threaded fasteners and the four mounting holes, the water-in conduit 44 extends through a drilled hole in the fuel-water separator housing sidewall, providing access to the interior. The water-in-fuel sensor probes 42a and 42b which are arranged side-by-side in sleeve 53, extend into the interior of the fuel-water separator housing (collection bowl) by means of a drilled hole in the housing sidewall. Both drilled holes are sealed at the interface between the outer edge of the hole and the inserted portions of the integrated control module 40 so that there is no fluid leakage at those interfaces. When mounted onto the fuel-water separator housing, the integrated control module 40 is oriented so that the water-out conduit 45 is directed downwardly and the water-in-fuel sensor probes 42a and 42b are located axially above the water-in conduit 44, as previously described.

With reference to FIG. 5, a second embodiment of integrated control module 20 is illustrated in a base-mounted configuration and is identified as module 60. The actual assembly technique of module 60 into the fuel-water separator housing is by means of a screw-in relationship. The outer wall 61 of housing 62 includes an externally-threaded portion 63 which threadedly engages an internally-threaded bore in the base or bottom portion of the fuel-water separator housing. The upper surface 64*a* of the enlarged base 64 of module 60 is used to compress seal 65 against the fuel-water separator housing as the threaded engagement tightens. This creates a sealed and leak-free interface between the integrated control module 60 and the fuel-water separator housing. Integrated control module 60 is electrically equivalent to control module 40 and to integrated control module 20. There are only mechanical differences in the packaging configuration, the mounting location, and the mounting method between integrated control module 60 and integrated control module 40. The electrical configuration of integrated control module 60 and integrated control module 40 has been described in the context of integrated control module 20, which is electrically generic to both embodiments.

Since the majority of integrated control module 60 is physically located inside of the fuel-water separator housing, it will be understood why the water-in-fuel sensor probes 67*a* and 67*b* are at the uppermost end (axially) of the integrated control module 60. The water-in conduit 68 is an aperture in the body of the integrated control module 60 and this leads directly to the solenoid-controlled drain valve. The solenoid, the first control circuit, and the second control circuit are all positioned on the interior of integrated control module 60 and are hidden from view in FIG. 5. The power connection 70 and water-out conduit 71 are located in the enlarged base 64, as is illustrated.

While first and second control circuits 26 and 27 have been identified, there is physically an electronics printed circuit board which collectively provides the control circuitry for the present invention. In this regard, control circuit 26 and control circuit 27 could also be considered as control circuit portions of the printed circuit board. The two probes 22*a* and 22*b*, as well as the corresponding probes for the first and second embodiments of the present invention, are electrically connected to the electronics printed circuit board. In the preferred embodiments, this electronics printed circuit board has a circular shape with an outside diameter of approximately 1.4 inches. Additionally, the power connection 23 for integrated control module 20 and the corresponding power connection for integrated control module 40 and integrated control module 60 is a molded connector with two inset contact pins 23*a* and 23*b*. As indicated, a virtually identical construction is used for power connection 43 of integrated control module 40 and for power connection 70 of integrated control module 60. The two contact pins for each molded connector (i.e., power connection) are mounted to the printed circuit board prior to the injection molding step which is used to create the molded connector.

Figure 6:
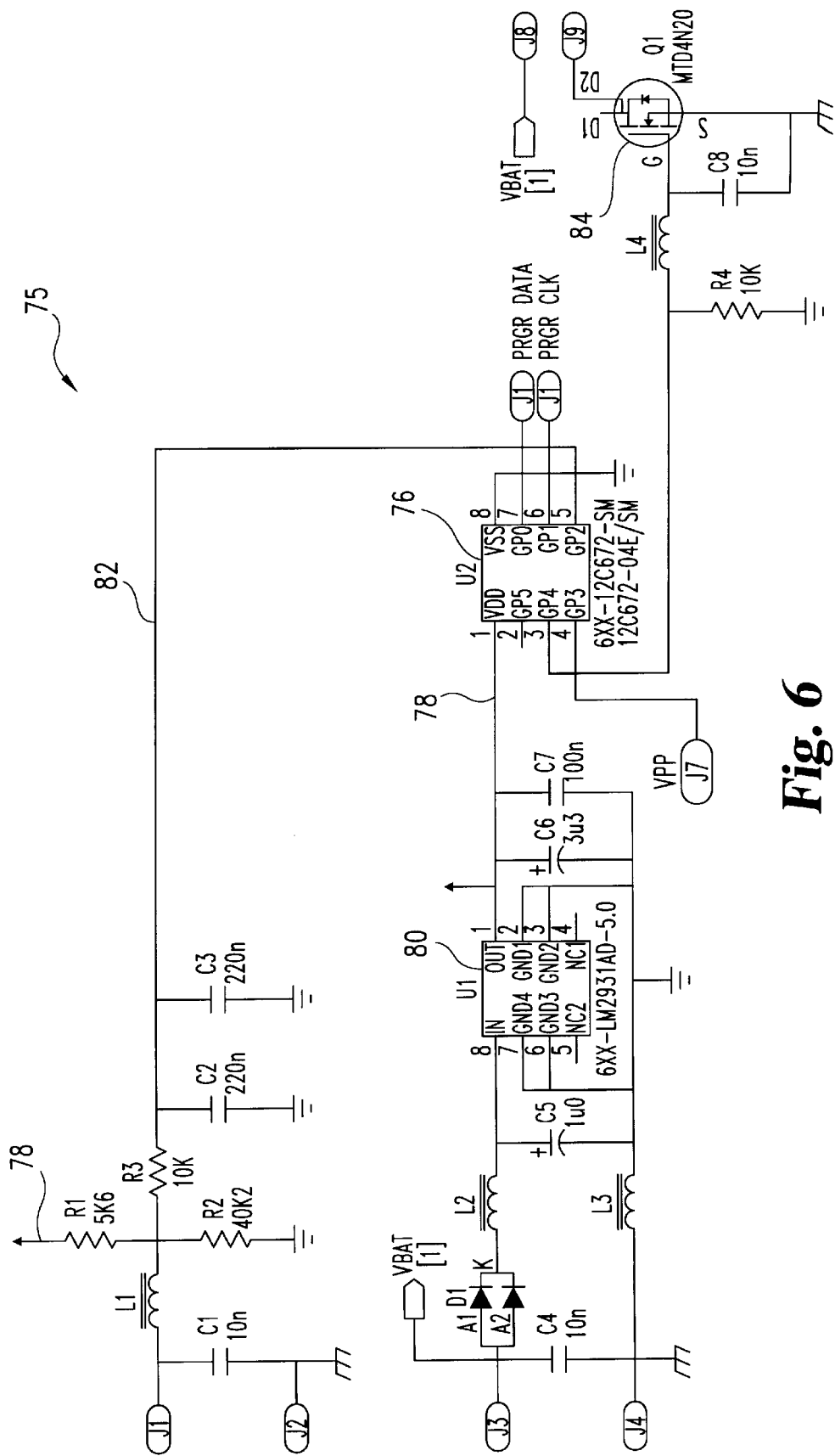
FIG. 6 is a circuit schematic for the FIG. 1 integrated control module of the present invention.

The control circuitry schematic for control circuits 26 and 27 is illustrated in FIG. 6. Referring now to FIG. 6, there is illustrated an electronic schematic diagram of a preferred embodiment transducer controller of the present invention, indicated generally at 75. The controller 75 is preferably based upon a model PIC12C672 microcontroller 76 available from Microchip in Chandler, Ariz., although those having ordinary skill in the art will recognize that any microprocessor or microcontroller may be used. The microcontroller 76 is supplied with nominal +5V power from the input line 78. This +5V power is provided from the output of power supply 80, which is preferably a model LM2931AD, manufactured by Motorola of Phoenix, Ariz. Input power to the power supply 80 is supplied by the vehicle electrical system at terminal J3 and is nominally +12V, however the controller 75 is designed to work within an input voltage range of +9 to +16 Vdc. Reverse input voltage protection is provided by the diode pair D1, while EMI interference suppression is provided by the capacitors C4–C7 and the inductors L2 and L3. The ground connection, also from the vehicle power supply, is coupled to input J4. Terminals J5 and J6 are provided for programming the microcontroller 76, and are utilized for the input of program data and the program clock, respectively, as is known in the art.

The two water-in-fuel (WIF) probes 23*a* and 23*b* are coupled to the inputs J1 and J2. Input noise suppression is provided by the capacitor C1 and the inductor L1. As can be seen from FIG. 6, the WIF probes 23*a* and 23*b* form part of a resistor voltage divider network including the resistors R1 and R2, which are coupled between the +5V power supply 78 and ground. The output 82 of this voltage divider network is coupled to the GP2 I/O port of the microcontroller 76. When the transducer probes coupled to ports J1 and J2 are immersed in water, the drop in the equivalent WIF resistance between the probes results in the WIF probe voltage 82 dropping below 4.5 Vdc. Should metal debris or other highly conductive material contaminate the WIF probe, the equivalent WIF resistance will drop substantially lower than is normal for the water-in-fuel condition. In order to prevent false drain events, the microcontroller 76 will not activate the drain if the WIF probe voltage 82 is lower than +1 Vdc. The resistance values of the voltage divider network are thus chosen such that substantial shorting of the probes J1 and J2 will result in most of the +5V supplied by line 78 being dropped across the resistor R1, reducing the WIF probe voltage 82 to a value well below +1 Vdc.

The microcontroller 76 contains an internally stored software program which controls its operation. The WIF probe voltage 82 appearing on the I/O port GP2 is periodically sampled, preferably at a minimum rate of 10 hertz. The software compiles a running average of four samples of the WIF probe voltage 82 in order to further improve the signal-to-noise ratio by suppression of EMI and other system anomalies.

The software within the microcontroller 76 continuously monitors this average WIF probe voltage. When the probe voltage falls between +1 Vdc and +4.5 Vdc continuously for five seconds, the microcontroller 76 energizes its I/O port GP4. The GP4 port is coupled to the gate of a power field effect transistor (FET) 84, which is preferably an MTD4N20 transistor. The drain of the transistor 84 is coupled to the J9 output, which drives the solenoid water drain valve. Therefore, activation of the GP4 I/O port turns on the transistor 84, which in turn energizes the solenoid, thereby activating the water drain valve. The microcontroller 76 energizes the transistor 84 (and hence the solenoid water drain valve) for approximately 10 seconds. Afterwards, the I/O port GP4 is deactivated, de-energizing the transistor 84 and the solenoid. In order to prevent repetitive toggling of the solenoid water drain valve, the microcontroller 76 utilizes an internal timer to determine if the transistor 84 has been de-energized for a minimum of 10 seconds before activating the GP4 I/O port. If the transistor 84 has not been de-energized for a minimum of 10 seconds, then the microcontroller 76 will not energize the GP4 I/O port. This ensures that the solenoid water drain valve will only be turned on at a maximum of 10 second intervals.

The foregoing circuitry description is applicable to both primary embodiments of the present invention. While only the corresponding reference numbers associated with integrated control module 20, as contrasted to integrated control module 40 or integrated control module 60, have been used, it is to be understood that the only real difference between the diagrammatic representation for integrated control module 20 and the two primary embodiments of the present invention represented as integrated control module 40 and integrated control module 60 is in respect to the mechanical and packaging configurations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An integrated control module for connection to a source of electricity and for use in conjunction with a fuel-water separator which is constructed and arranged to separate water from fuel, said integrated control module being constructed and arranged to drain water from within said fuel-water separator which has accumulated adjacent a drain location, said integrated control module comprising:

a water-in-fuel sensor having a pair of spaced-apart probes which are positioned relative to said fuel-water separator so as to be contacted by said accumulated water;

a drain valve having a water-in conduit which is constructed and arranged to be positioned in said accumulated water at a location which is remote from said pair of spaced-apart probes and further including a water-out conduit constructed and arranged to route accumulated water out of said fuel-water separator;

a solenoid constructed and arranged to control the flow of accumulated water from said water-in conduit to said water-out conduit, said solenoid being in a normally-closed condition which blocks any flow of accumulated water from said water-in conduit to said water-out conduit, when electrically energized said solenoid changing to an open condition which enables accumulated water flow through said drain valve from said water-in conduit out through said water-out conduit;

an electrical connector having a positive terminal and a negative terminal and being constructed and arranged for connection to a source of electricity; and a control circuit having a first circuit portion and a cooperating second circuit portion, said first circuit portion being electrically connected between said positive terminal and one probe of said pair of spaced-apart probes, said second circuit portion being normally opened and electrically connected between said negative terminal and said solenoid, said second circuit portion being further electrically connected to the other probe of said pair of spaced-apart probes, wherein the connection between said second circuit portion and said other probe is for conditioning said normally open second circuit portion such that when accumulated water establishes a conductive path between the pair of spaced-apart probes for a predetermined duration of time, the normally open second circuit portion is closed, thereby coupling the negative terminal to said solenoid and causing energizing of said solenoid so as to place said solenoid in said open condition, thereby enabling the flow of accumulated water through said drain valve.

2. The integrated control module of claim 1 wherein said control circuit includes a voltage divider network.

3. The integrated control module of claim 1 wherein said control circuit includes a microcontroller.

4. The integrated control module of claim 1 wherein said control circuit includes means for sensing an average probe voltage which voltage is based on a resistance measurement taken between said pair of spaced-apart probes.

5. The integrated control module of claim 4 wherein said control circuit includes microcontroller means for continuously monitoring the probe voltage and timing means for establishing a monitoring interval of approximately 5 seconds.

6. The integrated control module of claim 1 wherein said control circuit includes a timing portion for keeping the solenoid energized, and thus open, for approximately 10 seconds.

7. The integrated control module of claim 1 which is constructed and arranged to operably attach to a sidewall of a fuel-water separator housing.

8. The integrated control module of claim 1 which is constructed and arranged to operably attach to a base of a fuel-water separator housing.

9. In combination:

a fuel-water separator having an outer shell with a base and a defined hollow interior, said hollow interior having a water accumulation region for water which is separated from fuel to accumulate; and an integrated control module which is constructed and arranged to attach to said fuel-water separator and being constructed and arranged to drain water from within said fuel-water separator which has accumulated in said water accumulation region, said integrated control module comprising:

a water-in-fuel sensor having a pair of spaced-apart probes which are constructed and arranged to extend into said defined hollow interior and into said water accumulation region, at a location which is remote from said base;

a drain valve having a water-in conduit which is constructed and arranged to be positioned in said accumulated water region at a location which is remote from said pair of spaced-apart probes and further including a water-out conduit constructed and arranged to route accumulated water out of said fuel-water separator;

a solenoid constructed and arranged to control the flow of accumulated water from said water-in conduit to said water-out conduit, said solenoid being in a normally-closed condition which blocks any flow of accumulated water from said water-in conduit to said water-out conduit, when electrically energized said solenoid changing to an open condition which enables accumulated water flow through said drain valve from said water-in conduit out through said water-out conduit;

an electrical connector having a positive terminal and a negative terminal and being constructed and arranged for connection to a source of electricity; and a control circuit having a first circuit portion and a cooperating second circuit portion, said first circuit portion being electrically connected between said positive terminal and one probe of said pair of spaced-apart probes, said second circuit portion being normally opened and electrically connected between said negative terminal and said solenoid, said second circuit portion being further electrically connected to the other probe of said pair of spaced-apart probes, wherein the connection between said second circuit portion and said other probe is for conditioning said normally open second circuit portion such that when accumulated water establishes a conductive path between the pair of spaced-apart probes for a predetermined duration of time, the normally open second circuit portion is closed, thereby coupling the negative terminal to said solenoid and causing energizing of said solenoid so as to place said solenoid in said open condition, thereby enabling the flow of accumulated water through said drain valve.

10. The combination of claim 9 wherein said control circuit includes a voltage divider network.

11. The combination of claim 9 wherein said control circuit includes a microcontroller.

12. The combination of claim 9 wherein said control circuit includes means for sensing an average probe voltage which voltage is based on a resistance measurement taken between said pair of spaced-apart probes.

13. The combination of claim 12 wherein said control circuit includes microcontroller means for continuously monitoring the probe voltage and timing means for establishing a monitoring interval of approximately 5 seconds.

14. The combination of claim 9 wherein said control circuit includes a timing portion for keeping the solenoid energized, and thus open, for approximately 10 seconds.

15. The combination of claim 9 wherein said integrated control module is constructed and arranged to operably attach to the outer shell of said fuel-water separator.

16. The combination of claim 9 wherein said integrated control module is constructed and arranged to operably attach to the base of said fuel-water separator.

* * * * *